(12) United States Patent
Chang et al.

(10) Patent No.: US 6,902,822 B1
(45) Date of Patent: Jun. 7, 2005

(54) BIAXIALLY ORIENTED POLYPROPYLENE SLIP FILM FOR PACKAGING WITH STABLE COEFFICIENT OF FRICTION PROPERTIES

(75) Inventors: Keunsuk P. Chang, N. Kingstown, RI (US); A. Michael Nahmias, N. Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 0 days.

(21) Appl. No.: 09/383,724

(22) Filed: Aug. 26, 1999

Related U.S. Application Data

(60) Provisional application No. 60/111,578, filed on Dec. 9, 1998.

(51) Int. Cl.[7] ............................................. B32B 27/32
(52) U.S. Cl. ...................................... 428/516; 428/447
(58) Field of Search ............................. 428/516, 447, 428/353, 213, 215

(56) References Cited

U.S. PATENT DOCUMENTS

| | | | |
|---|---|---|---|
| 4,394,235 A | 7/1983 | Brandt et al. | 204/165 |
| 4,419,411 A | 12/1983 | Park | 428/516 |
| 4,533,509 A | 8/1985 | Gust et al. | 264/171 |
| 4,590,125 A | 5/1986 | Balloni et al. | 428/349 |
| 4,659,612 A | 4/1987 | Balloni et al. | 428/213 |
| 4,692,379 A | 9/1987 | Keung et al. | 428/349 |
| 4,725,466 A | 2/1988 | Crass et al. | 428/35 |
| 4,764,425 A | 8/1988 | Balloni et al. | 428/33 |
| 4,785,042 A * | 11/1988 | Azuma et al. | 524/210 |
| 4,855,187 A | 8/1989 | Osgood, Jr. et al. | 428/516 |
| 5,271,976 A * | 12/1993 | Kondo et al. | 428/35.2 |
| 5,441,802 A * | 8/1995 | Mizuno et al. | 428/327 |
| 5,482,780 A | 1/1996 | Wilkie et al. | 428/515 |
| 5,489,473 A | 2/1996 | Wilkie | 428/323 |
| 6,291,063 B1 * | 9/2001 | Shah et al. | 428/331 |

FOREIGN PATENT DOCUMENTS

| | | |
|---|---|---|
| EP | 0 353 368 | 7/1990 |
| WO | 94/14606 | 7/1994 |

* cited by examiner

*Primary Examiner*—D. Lawrence Tarazano
(74) *Attorney, Agent, or Firm*—Morrison & Foerster LLP

(57) ABSTRACT

A polypropylene film contains a non-migratory slip package of an aluminosilicate additive and a silicone oil and/or a crosslinked silicone polymer resin. This film has excellent and stable COF (coefficient of friction) properties and exhibits a marked improvement in stable slipperiness, excellent transparency, and excellent printability.

9 Claims, No Drawings

BIAXIALLY ORIENTED POLYPROPYLENE SLIP FILM FOR PACKAGING WITH STABLE COEFFICIENT OF FRICTION PROPERTIES

REFERENCE TO RELATED APPLICATION

This application claims priority from Provisional Application Ser. No. 60/111,578, filed Dec. 9, 1998.

FIELD OF INVENTION

This invention relates to a polypropylene film containing a non-migratory slip package of an aluminosilicate additive and a silicone oil and/or a crosslinked silicone polymer resin. This film has excellent and stable coefficient of friction (COF) properties and exhibits a marked improvement in stable slipperiness, excellent transparency, and excellent printability.

BACKGROUND OF INVENTION

Biaxially oriented polypropylene slip films used for packaging applications often perform multiple functions. They must perform in laminations as slip films with low and stable COF; and they must perform as print films with good optical clarity, gloss, and ink adhesion.

Traditional methods for producing a functional slip film have often relied upon relatively high amide-type additives. These fatty amides (e.g. erucamide, stearamide, behenamide), typically in concentrations of 2000–5000 ppm, bloom to the surface of the film. The amide molecule form bumps on the polymer surface, thus reducing surface-to-surface contact and lowering the COF. However, the drawback of such additives is their migratory behavior in polyolefin films. The amount of additive bloom to the surface can vary with environmental conditions, and thus slip properties can vary greatly depending on storage conditions seasonal changes in humidity and temperature, or geographical differences in temperature and humidity. Warmer storage conditions tend to enhance blooming of these amides, whereas cool storage conditions tend to slow the migration process. If too little additive blooms, the laminated film may exhibit high COF and cause web breaks on the packaging machine's forming collar or sealing bars from excessive friction. If too much additive blooms, the laminated film may exhibit a COF that is too low for the packaging machine's tension control system, causing wrinkling or "flooding" of the line. Because of the variability in storage conditions, the same slip film using these amide systems can exhibit both extremes of COF properties.

In addition, the use of fatty amide additives also tends to make the film hazy and less glossy. This is undesirable from the point of view of print graphics appeal. Moreover, the migratory nature of the amide additive packages make them prone to bloom to the print surface of the slip film or transfer from the slip surface to the print surface when in wound roll form. The presence of amides on the print surface can interfere with the wettability and adhesion of water-based inks and, especially for process print applications, cause bridging of ink dots or inconsistent dot sizes. This results in muddier colors or images and a loss of graphic appeal.

SUMMARY OF THE INVENTION

An objective of this invention is to solve the aforesaid problems of conventional slip films by providing an additive system that is essentially non-migratory. This will result in a slip film with stable slip and COF properties. In addition, such a film will offer excellent printability and transparency.

One aspect of the present invention is a polyolefin-based laminate film comprising at least 2 layers:

a) a first polyolefin-based resin layer having a surface treated by a discharge treatment method that imparts excellent printability; and b) a polyolefin-based mixed resin layer formed on one surface of the first polyolefin-based resin layer opposite of the surface treatment, wherein the first polyolefin-based resin layer and the polyolefin-based mixed resin layer optionally contain up to 800 ppm of fatty amides such as stearamide or erucamide and the polyolefin-based mixed resin layer contains a first additive material comprising at least one crosslinked silicone polymer in an amount of about 0.1%–0.5% by weight of the polyolefin-based mixed resin layer and/or at least one silicone oil in an amount of about 0.02% –0.2% by weight of the polyolefin-based mixed resin layer, and a second additive material in an amount of about 0.10–0.50% by weight of the polyolefin-based mixed resin layer, which comprises at least one amorphous aluminosilicate.

According to this invention, this objective and other advantages are achieved by a propylene polymer film composed of a composition comprising of at least a 2-layer coextruded film, with the print surface modified with a discharge treatment method; and the slip surface modified with a non-migratory crosslinked silicone polymer resin and/or a silicone oil and a non-migratory silicate powder additive for good slip and antiblock properties. Additionally, if amide-type additives are desired to be used, this invention allows the amount of amide additive used to be significantly reduced (less than 1000 ppm) compared to conventional slip film designs (2000–5000 ppm typical).

DETAILED DESCRIPTION OF THE INVENTION

Materials that may be employed for the biaxially oriented layer are propylene homo-copolymers or copolymers of propylene and other α-olefins having 2 to 10 carbon atoms. In the case of copolymers, the amount of α-olefin subjected to copolymerization is less than 5% based on the weight of the copolymer as a standard. If the amount of copolymer exceeds this level, the biaxially oriented layer becomes too soft, with consequent insufficient service strength of the laminate film. Into the biaxially oriented layer various additives may be introduced (normally in the range of 0.01 to 2% based on the weight of the biaxially oriented layer as a standard). These include various additives known as additives for polypropylene, for example, stabilizers, antioxidants, ultra-violet absorbers, plasticizers, antistatic agents, anti-blocking agents, organic lubricants, pigments, coloring agents, nucleating agents, etc. Similarly, other kinds of polymers known as suitable for mixing into polypropylene may be added, for example, polyethylene, polybutene-1, poly (4-methylpentene-1), etc. These may be added by mixing in an amount of about 0.1 to 5% based on the weight of the biaxially oriented layer.

The polyolefin-based laminate film has excellent and stable slip properties, low and stable coefficient of friction, low haze and excellent printability.

In a preferred embodiment, the first polyolefin-based resin layer has a thickness of about 6–40 $\mu$m. In another embodiment, this polyolefin-based resin layer is made of polypropylene-based resin. The polyolefin-based mixed resin layer has a thickness of about 0.2–5.0 $\mu$m.

In another embodiment, at least one component of the first additive material is a crosslinked silicone resin having a spherical average particle size of 2–5 μm, a specific gravity of 1.32 at 25° F., a bulk density of 0.15–0.50, and a linseed oil absorption rate of 50–90 mil 00g; and/or at least one component of the first additive material is a silicone oil having viscosity of 300–400 cSt., specific gravity at 77° F. of 0.90–0.99, and volatile content of 0.001–0.005%.

In another embodiment, at least one component of the additives is an anti-block material which is an amorphous sodium calcium aluminosilicate having a particle size of 2–5 μm and a bulk density of 0.30–0.80 g/cm³ or an amorphous aluminosilicate having a particle size of 2–5 μm and a bulk density of 0.10–0.30 g/cm³.

In another embodiment, at least one component of the second additive material is an amorphous sodium calcium aluminosilicate having a particle size of 2–5 μm and a bulk density of 0.30–0.80 g/cm³; or an amorphous aluminosilicate having a particle size of 2–5 μm and a bulk density of 0.10–0.30 g/cm³.

EXAMPLE 1

One hundred parts by weight of a crystalline propylene homopolymer resin; 0.0004 parts by weight of a silicone oil having a viscosity of 350 cSt. and a specific gravity of 0.97; and 0.005 parts by weight of a sodium calcium aluminosilicate powder having a mean particle diameter of 3 μm were blended together for the mixed resin layer, coextruded, and biaxially oriented to produce a 2-layer film where the mixed resin layer was 0.5 μm thick and the accompanying coextruded propylene homopolymer layer was 17 μm in thickness. The total oriented film thickness was 17.5 μm (70G or 0.7 mil thick). The film was then treated on the homopolymer side (the print surface); the mixed resin layer side was also treated but to a lesser degree (the slip side); and wound in roll form. The COF static and dynamic, hot slip properties, haze, print surface wetting tension, and printability were tested after the film was produced.

EXAMPLE 2

Example 1 was repeated except that 0.003 parts by weight of a crosslinked silicone polymer of 3.0 μm size were used in place of the silicone oil.

EXAMPLE 3

Example 1 was repeated except that the amount of aluminosilicate added was changed to 0.0025 parts by weight.

EXAMPLE 4

Example 2 was repeated except that the amount of aluminosilicate added was changed to 0.0025 parts by weight.

EXAMPLE 5

Example 1 was repeated except that the amount of silicone oil was increased to 0.0008 parts by weight.

EXAMPLE 6

Example 1 was repeated except that 0.003 parts by weight of a crosslinked silicone polymer of 3.0 μm size were added.

EXAMPLE 7

Example 6 was repeated except that the amount of aluminosilicate added was changed to 0.0025 parts by weight.

EXAMPLE 8

Example 1 was repeated except that the accompanying coextruded propylene homopolymer layer additionally contained 0.0004 parts by weight of stearamide.

EXAMPLE 9

Example 8 was repeated except that the stearamide was replaced with erucamide.

EXAMPLE 10

Example 8 was repeated except that the mixed resin layer additionally contained 0.0006 parts by weight stearamide.

COMPARATIVE EXAMPLE 1

Example 1 was repeated except that no silicone oil was used.

COMPARATIVE EXAMPLE 2

One hundred parts by weight of a random ethylene propylene butylene terpolymer resin; 0.003 parts by weight of erucamide fatty amide; 0.0004 parts silicone oil; and 0.003 parts by weight of a crosslinked silicone polymer having a mean particle diameter of 4.5 μm were blended together for the mixed resin layer, coextruded, and biaxially oriented to produce a 2-layer film where the mixed resin layer was 0.5 μm thick and the accompanying coextruded propylene homopolymer layer was 17 μm in thickness. The accompanying coextruded propylene homopolymer layer also contained 0.0004 parts by weight steramide. The total oriented film thickness was 17.5 μm (70G or 0.7 mil thick). The film was then treated on the homopolymer side (the print surface); the mixed resin layer side was also treated but to a lesser degree (the slip side); and wound in roll form. The COF static and dynamic, hot slip properties, haze, print surface wetting tension, and printability were tested after the film produced.

COMPARATIVE EXAMPLE 3

One hundred parts by weight of a crystalline propylene homopolymer resin; 0.003 parts by weight of behenamide and oleamide fatty amide were blended together with 0.0025 parts by weight of an amorphous silica for the mixed resin layer, coextruded, and biaxially oriented to produce a 2-layer film where the mixed resin layer was 0.5 μm thick and the accompanying coextruded propylene homopolymer layer was 17 μm in thickness. The total oriented film thickness was 17.5 μm (70G or 0.7 mil thick). The film was then treated on the homopolymer side (the print surface); the mixed resin layer side was also treated but to a lesser degree (the slip side); and wound in roll form. The COF static and dynamic, hot slip properties, haze, print surface wetting tension, and printability were tested after the film produced.

The various properties of the films set forth in the Examples were measured by the following methods:

A) Transparency of the film was measured by measuring the haze of a single sheet of film measured substantially in accordance with ASTM D1003. In general, the preferred value was less than 3.0% haze.

B) Gloss of the film was measured via a surface reflectivity gloss meter at 60°/60° angle.

C) Wetting tension of the film was measured using dyne solutions substantially in accordance with ASTM D2578.

D) Printability was measured by drawing down blue ink onto a single sheet of film using a meyer rod; drying the sheet in a hot air convection oven at 60° C. for 1 minute; and noting the amount of ink removal when a strip of 1-inch wide 610 tape was applied and removed from the inked surface. The amount of ink removed was rated qualitatively with 5 equaling no ink removed and 1 equaling total ink removal. In general, the preferred value was 4–5.

E) Slipperiness of the film was measured by measuring static and kinetic COF of sheets of film via a surface property tester substantially in accordance with ASTM D1894. A 4"×4" sled was used at ambient conditions. In general, acceptable values of the dynamic COF ranges between 0.16 and 0.45; preferred values are between 0.25 and 0.35.

The properties of the films of the foregoing Examples ("Ex.") and Comparative Examples ("CEx.") are shown in Table 1.

TABLE 1

| Sample | Gauge | Haze (%) | Print Side Gloss @ 60/60 | Print Side Wetting Tension (dynes/cm) | Printability Scale 1–5; 5 = best, 1 = worst | Slip Side COF (st/dy) |
|---|---|---|---|---|---|---|
| Ex. 1 | 70 | 1.8 | 143.0 | 42 | 5 | 0.32/0.26 |
| Ex. 2 | 70 | 2.2 | 140.3 | 44 | 5 | 0.28/0.25 |
| Ex. 3 | 70 | 1.6 | 142.0 | 41 | 5 | 0.33/0.31 |
| Ex. 4 | 70 | 2.0 | 141.6 | 41 | 5 | 0.31/0.28 |
| Ex. 5 | 70 | 2.2 | 143.0 | 42 | 5 | 0.30/0.26 |
| Ex. 6 | 70 | 2.7 | 138.0 | 42 | 5 | 0.23/0.20 |
| Ex. 7 | 70 | 2.4 | 140.0 | 42 | 5 | 0.28/0.25 |
| Ex. 8 | 70 | 2.5 | 141.7 | 42 | 4 | 0.29/0.25 |
| Ex. 9 | 70 | 2.5 | 142.2 | 42 | 4 | 0.33/0.28 |
| Ex. 10 | 70 | 2.6 | 140.1 | 41 | 4 | 0.32/0.28 |
| CEx. 1 | 70 | 1.8 | 138.0 | 42 | 5 | 0.32/0.30 |
| CEx. 2 | 70 | 2.7 | 129.2 | 41 | 3 | 0.20/0.18 |
| CEx. 3 | 70 | 2.1 | 141.5 | 41 | 4 | 0.24/0.20 |

Table 2 shows the hot slip performance using a surface property tester modified with a 1"×1" sled instead of a 4"×4" sled of selected Examples and Comparative Examples. COF was measured at ambient conditions, 40° C., 60° C., 80° C., and 100° C. These conditions simulated performance under severe frictional heating that can be experienced on a packaging machine's forming collar. Test laminations of selected example films were produced for this comparison. In general, preferred hot slip performance indicated stable COF across the range of temperatures tested; at 100° C., the preference is for hot slip to be below 1.0 COF.

TABLE 2

| | Hot Slip COF (st/dy) | | | | |
|---|---|---|---|---|---|
| Sample | 20 C. | 40 C. | 60 C. | 80 C. | 100 C. |
| Ex. 1 | 0.33/0.27 | 0.32/0.28 | 0.30/0.23 | 0.34/0.24 | 0.55/0.34 |
| Ex. 2 | 0.34/0.26 | 0.31/0.27 | 0.32/0.25 | 0.34/0.26 | 0.57/0.31 |
| Ex. 6 | 0.23/0.20 | 0.25/0.20 | 0.26/0.21 | 0.33/0.27 | 0.60/0.36 |
| CEx. 1 | 0.34/0.28 | 0.42/0.39 | 0.50/0.49 | 0.77/0.68 | off-scale |
| CEx. 2 | 0.25/0.19 | 0.26/0.25 | 0.34/0.28 | 0.93/0.55 | off-scale |
| CEx. 3 | 0.28/0.23 | 0.30/0.23 | 0.31/0.27 | 0.35/0.29 | 1.11/0.39 |

Table 3 shows the COF properties of selected samples aged for 6 months at ambient conditions in an outside warehouse under varying seasonal changes in temperature and humidity. The COF properties were compared between freshly-made film and aged film. The preferred performance should exhibit relatively stable COF performance between fresh and aged films.

TABLE 3

| Sample | COF (st/dy) "Fresh-made" | COF (st/dy) Aged 6 mos. |
|---|---|---|
| Ex. 1 | 0.32/0.26 | 0.32/0.29 |
| Ex. 2 | 0.28/0.25 | 0.29/0.26 |
| Ex. 6 | 0.30/0.26 | 0.31/0.28 |
| CEx. 1 | 0.32/0.30 | 0.32/0.30 |
| CEx. 2 | 0.19/0.18 | 0.15/0.13 |
| CEx. 3 | 0.29/0.25 | 0.24/0.20 |

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

What is claimed is:

1. A two-layer laminate film, comprising:

a) a first resin layer comprising a polyolefin resin and having a surface treated by a discharge treatment method that imparts printability to the treated surface; and b) a second resin layer comprising a resin, a first additive material and a second additive material, wherein the resin of the second resin layer consists essentially of polypropylene and the second resin layer is formed on and adhered to a surface of said first resin layer opposite the treated surface having said surface treatment, wherein the first resin layer and the second resin layer each contain up to 800 ppm fatty amides comprising stearamide or erucamide, the first additive material comprises at least one crosslinked silicone polymer in an amount of about 0.1%–0.5% by weight of the second resin layer and/or at least one silicone oil in an amount of about 0.02%–0.08% by weight of the second resin layer, and the second additive material comprises at least one amorphous aluminosilicate in an amount of about 0.10–0.50% by weight of the second resin layer.

2. The two-layer laminate film according to claim 1, wherein said first resin layer has a thickness of about 6–40 μm.

3. The two-layer laminate film according to claim 1 or 2, wherein said first resin layer consists essentially of polypropylene.

4. The two-layer laminate film according to claim 1 or 2, wherein said second resin layer has a thickness of about 0.2–5.0 μm.

5. The two-layer laminate film according to claim 1, wherein at least one component of said first additive material is a crosslinked silicone resin having a spherical average particle size of 2–5 μm, a specific gravity of 1.32 at 25° F., a bulk density of 0.15–0.50, and a linseed oil absorption rate of 50–90 ml/100 g or is a silicone oil having viscosity of 300–400 cSt., specific gravity at 77° F. of 0.90–0.99, and volatile content of 0.001–0.005%.

6. The two-layer laminate film according to claim 1, further comprising an anti-block material which is an amorphous sodium calcium aluminosilicate having a particle size of 2–5 μm and a bulk density of 0.30–0.80 g/cm$^3$ or an amorphous aluminosilicate having a particle size of 2–5 μm and a bulk density of 0.10–0.30 g/cm$^3$.

7. The two-layer laminate film according to claim 1, wherein at least one component of said second additive material is an amorphous sodium calcium aluminosilicate having a particle size of 2–5 μm and a bulk density of 0.30–0.80 g/cm$^3$; or an amorphous aluminosilicate having a particle size of 2–5 μm and a bulk density of 0.10–0.30 g/cm$^3$.

8. The two-layer laminate film according to claim 1 or 2, wherein the polyolefin resin of the first resin layer consists essentially of a polypropylene homopolymer.

9. The two-layer laminate film according to claim 1 or 2, wherein the resin of the second resin layer consists of a polypropylene homopolymer.

* * * * *